Figure 1:
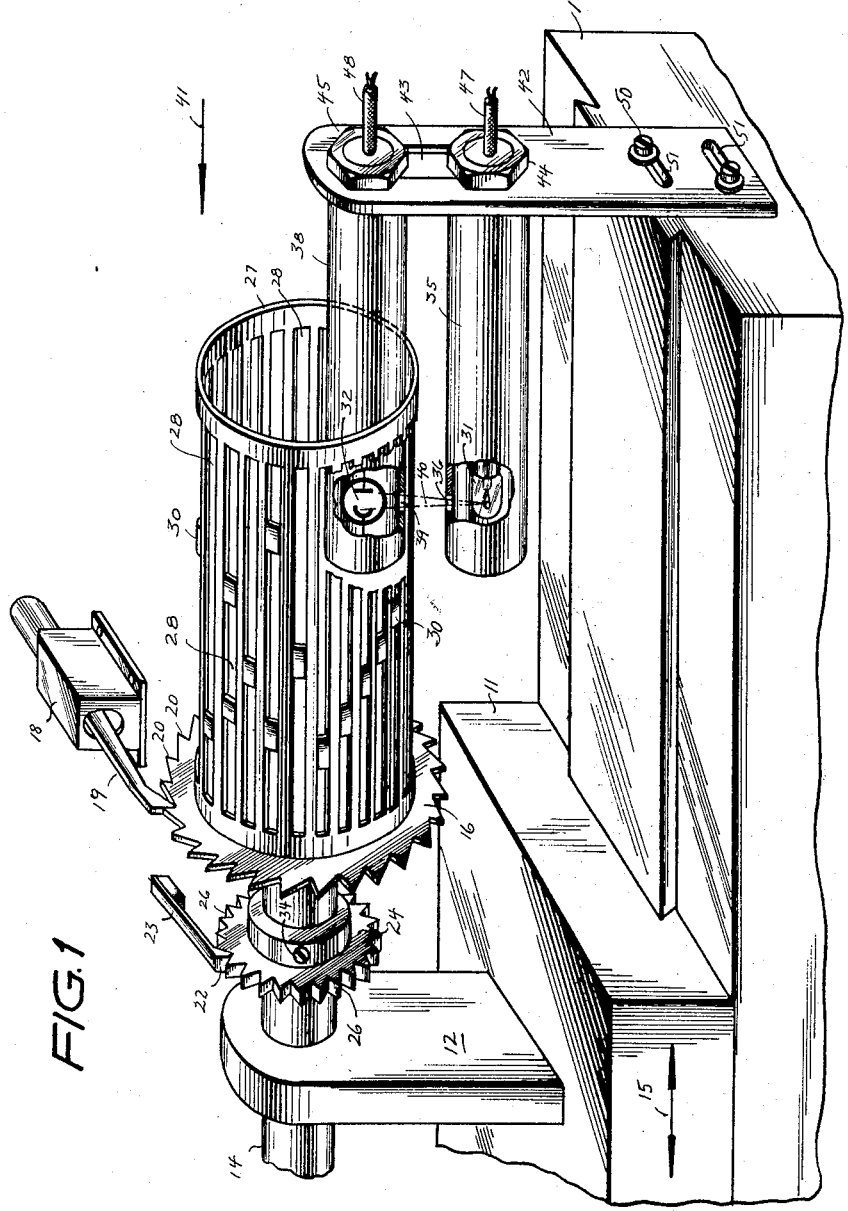

July 25, 1961  H. SCHOPPELREY  2,994,000
PHOTOELECTRIC PROGRAM CONTROL
Filed Sept. 13, 1960
2 Sheets-Sheet 1

INVENTOR:
HEINRICH SCHOPPELREY
By
Richardson, David and Nardon
Atty's.

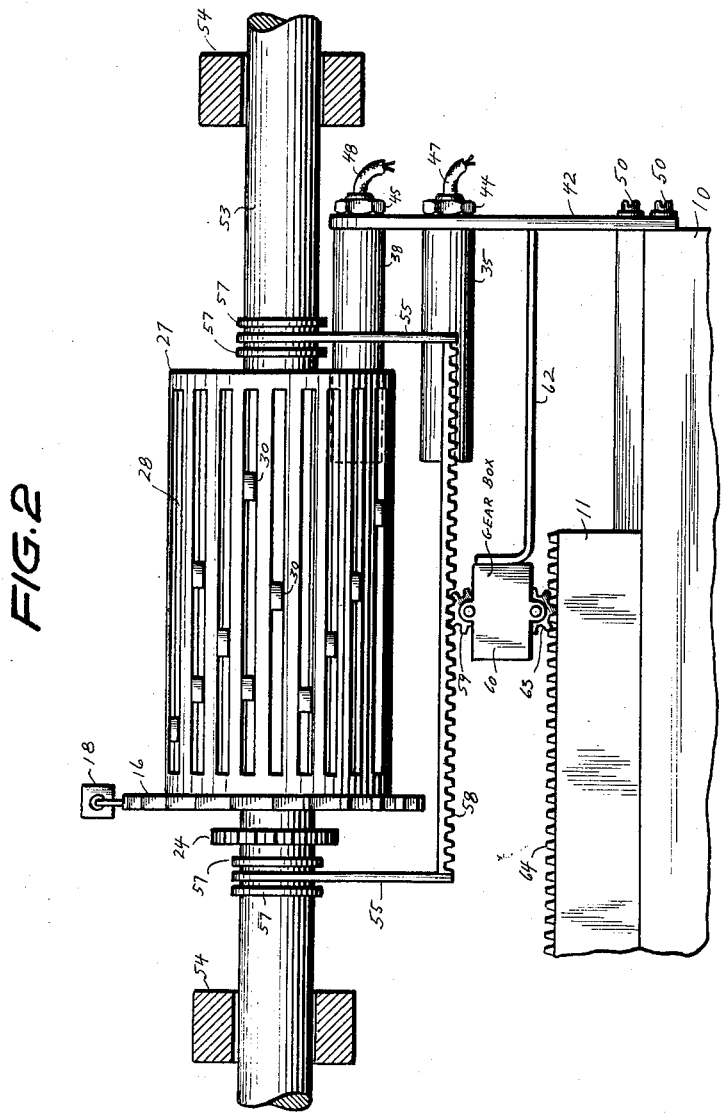

ized July 25, 1961

2,994,000
PHOTOELECTRIC PROGRAM CONTROL
Heinrich Schoppelrey, Schweinfurt (Main), Germany, assignor to Fichtel & Sachs A.G., Schweinfurt (Main), Germany, a corporation of Germany
Filed Sept. 13, 1960, Ser. No. 55,657
Claims priority, application Germany Sept. 22, 1959
9 Claims. (Cl. 250—233)

The present invention relates to an adjustable photoelectric control apparatus which is particularly suited for establishing predetermined operational programs for automatic machine tools or other automatic equipment comprising a member to be controlled which moves rectilinearly in accordance with the progress of the work.

The program control of the present invention provides apparatus which is readily adjustable for changing from one program to another. Moreover, the need for cams, limit switches and similar devices involving inertia and mechanical wear is avoided.

Briefly, the program control in accordance with the invention comprises a hollow cylindrical drum member having a series of uniformly circumferentially spaced axially extending longitudinal slots formed therein. Photoelectric control apparatus is provided which includes means for directing a beam of light through one of the slots, the beam passing between the interior and the exterior of the drum. At least one interceptor member for interrupting the light beam is longitudinally adjustably positioned in each of the slots. Axial displacement of the drum will bring the interceptor member in the particular slot which is in operative position and through which the light beam is then passing into beam intercepting position after a predetermined position of longitudinal displacement of the slot has been reached by axial displacement of the drum. Ratchet mechanism actuated by interruption of the light beam then rotates the drum through an angular displacement corresponding to the spacing between adjacent slots so that the light beam then passes through the next slot which is then in operative position and the interceptor member in the next slot is then positioned to control the axial displacement of the drum. The drum is mounted on a revoluble member which is carried by the member to be controlled and which moves axially with respect to the drum in accordance with the progress of the work such as a drilling operation, for instance. Conventional pulse responsive circuitry is associated with the photoelectric control apparatus and controls the actual operation of the machine tool in accordance with displacements of the member to be controlled, these displacements being scheduled by the program established by the positioning of the several interceptor members in their respective slots.

Various objects, features and advantages of the invention will become apparent upon reading the following description in conjunction with the accompanying drawing forming a part hereof.

Referring to the drawing:
FIGURE 1 is a perspective view of program control apparatus embodying the invention, partially broken away to illustrate details of construction.
FIGURE 2 is an elevational view, partly in section, of a modification of the control apparatus of FIG. 1.

In FIG. 1 of the drawing there is shown, by way of example, a fragment 10 of the bed of an automatic lathe. Slidably mounted on the lathe bed 10 is a tool carriage 11. An upright support 12 is rigidly mounted on the carriage 11. A shaft 14 is journaled in the support 12 and moves axially along with the tool carriage 11. The shaft 14 is axially reciprocated as indicated by the double-ended directional arrow 15 in accordance with the displacements of the tool carriage 11.

A ratchet wheel 16 is fixed to the free end of the shaft 14. The ratchet wheel 16 is advanced one tooth at a time by an electromagnetic actuator 18 comprising a pawl 19 which successively engages each of the teeth 20 of the ratchet wheel 16. A detent 22 mounted at the free end of a resilient arm 23 is held in spring-pressed engagement with the periphery of a notched disc 24 fixed on the shaft 14. The number of peripheral notches 26 in the disc 24 is equal to the number of teeth 20 on the ratchet wheel 16. The detent 22 thus holds the shaft 14 against rotation after each operation of the electromagnetic actuator 18.

Fixedly mounted on the ratchet wheel 16 coaxially with the shaft 14 is a hollow cylindrical drum 27. The lateral wall of the drum 27 has a series of axially extending longitudinal slots 28 formed therein, the slots 28 being uniformly circumferentially spaced around the drum 27. The number of slots 28 is equal to the number of teeth 20 in the ratchet wheel 16. Longitudinally slidably disposed in each of the slots 28 is at least one interceptor member 30. Suitable means, such as friction means (not shown), are provided for individually retaining each of the interceptor members 30 adjustably in any desired longitudinal position along its respective slot 28.

A light source such as an incandescent lamp 31 is disposed exteriorly of the drum 27. A photosensitive element such as a phototube 32 is disposed interiorly of the drum 27. The notched disc 24 is so locked in position on the shaft 14 by a set screw 34 that in each position of the notched disc 24 the detent 22 holds one of the slots 28 in the path of the light beam from the lamp 31 to the phototube 28 when the particular slot 28 is in operative position.

The lamp 31 is mounted inside a horizontally extending tubular housing 35 having a lateral aperture 36 formed therein through which light is directed toward the phototube 32. The phototube 32 is similarly mounted in a horizontally extending tubular housing 38 having a lateral aperture 39 formed therein through which light in the form of a beam 40 is received from the lamp 31. The beam 40 is formed by the aperture 36 in the lamp housing 35 and in each of the several definite rotational positions of the drum 27 passes through the particular one of the slots 28 which is then in operative position with respect to the light beam 40. At a predetermined position of axial displacement of the drum 27 in the direction of the arrow 41, for example, the beam 40 will be interrupted by one of the interceptor members 30. Upon interruption of the beam 40, control apparatus (not shown) connected to the phototube 32 will produce an impulse which directly affects the movement of the tool carriage 11 and may increase or decrease the speed of movement of the carriage 11 or may produce a quick return movement, as desired. A prearranged program may be obtained by the positioning of the various interceptor members 30 along their respective slots 28. The control apparatus also causes suitably timed energization of the electromagnetic actuator 18 to bring the next slot 28 into operative position with respect to the light beam 40.

An upright supporting arm 42 has a vertically elongated slot 43 formed therein. The housings 35 and 38 are vertically adjustably secured in the slot 43 by nuts 44 and 45, respectively. Two-conductor cords 47 and 48 extend from the lamp 31 and the phototube 32 to the previously mentioned control apparatus (not shown). The supporting arm 42 is laterally adjustably secured to the lathe bed 10 by screws 50 which pass through horizontally elongated slots 51 formed in the lower portion of the arm 42.

In FIG. 2, the drum 28 is mounted on a freely longitudinally slidable shaft 53 which is revolubly journaled in fixed bearing members 54. The actuator 18 and detent 22 are suitably mounted for horizontal movement along with the shaft 53. The detent 22 has been omitted from FIG. 2 for simplicity of illustration. Depending arms 55 are held against axial movement along the shaft 53 by collars 57. The shaft 53 is freely revoluble with respect to the arms 55 and suitable means (not shown) are provided to hold the arms 55 against rotation with the shaft 53 while freely permitting them to move simultaneously with the shaft 53 during axial displacement thereof. A toothed rack 58 extends horizontally between the lower free ends of the depending arms 55. The rack 58 engages an upper pinion 59 mounted in a gear box 60. The gear box 60 is fixed to the upright supporting arm 42 by a bracket 62. A lower pinion 63 mounted in the gear box 60 engages a toothed rack 64 formed on the tool carriage 11. The gearing within the gear box 60 is such that the pinions 59 and 63 both rotate in the same direction but the speed of the upper pinion 59 is slower than that of the lower pinions 63. This permits the length of the slots 28 in the drum 27 to be shorter than the length of the rack 64 on the tool carriage 11 so that large displacements of the tool carriage 11 may be controlled by a relatively short drum 27.

While I have shown what I believe to be the best embodiments of my invention, it will be apparent to those skilled in the art that various modifications may be made therein without departing from the spirit and scope of the invention as defined in the appended claims.

What is claimed is:

1. Photoelectric control apparatus of the class described, comprising an elongated control member having at least two laterally spaced parallel longitudinally extending slots formed therein; means for producing a light beam which passes through one of said slots in the operative position therebetween; stepping means for producing successive relative lateral displacements between said control member and said light beam through a distance equal to the distance between adjacent ones of said slots for bringing each of said slots and said light beam successively into said operative position; displacement means for moving said control member longitudinally at a rate directly proportional to the speed of displacement of a member to be controlled by said control apparatus; photoelectric means responsive to interruption of said beam; and at least one interceptor member longitudinally adjustably positioned in each of said slots for interrupting said light beam at a predetermined longitudinal position of said control member when the slot in which said interceptor member is positioned is in said operative position with respect to said light beam.

2. Photoelectric program control apparatus comprising: a revoluble and axially movable hollow cylindrical drum member having at least two circumferentially spaced axially extending longitudinal slots formed in the lateral wall thereof; stepping means for producing a predetermined rotational displacement of said drum member through an angle equal to the circumferential spacing between adjacent ones of said slots to bring each of said slots successively to a predetermined operative position; displacement means for moving said drum axially at a rate which is directly proportional to the speed of displacement of a member to be controlled by said control apparatus; means for directing a beam of light through each one of said slots when said slot is in said operative position; photoelectric means responsive to interruption of said beam; and at least one interceptor member longitudinally adjustably positioned in each of said slots for interrupting said beam at a predetermined axial position of said drum.

3. Photoelectric program control apparatus comprising: a revoluble and axially movable hollow cylindrical drum having a series of uniformly circumferentially spaced axially extending longitudinal slots formed therein in the lateral wall thereof; ratchet means for rotating said drum through a predetermined angular displacement equal to the angular circumferential spacing between adjacent ones of said slots to bring each of said slots successively to a predetermined fixed operative position; displacement means for moving said drum axially at a rate directly proportional to the speed of displacement of a member to be controlled by said control apparatus; means for directing a beam of light through each one of said slots when said slot is in said operative position; photoelectric means responsive to interruption of said beam; and at least one interceptor member longitudinally adjustably positioned in each of said slots for interrupting said beam at a predetermined axial position of said drum.

4. Apparatus according to claim 1, in which said displacement means comprises means mounting said control member on said member to be controlled for movement therewith.

5. Apparatus according to claim 1, in which said displacement means comprises gearing interconnecting said control member and said member to be controlled.

6. Apparatus according to claim 2, wherein said displacement means comprises means mounting said drum member on said member to be controlled for movement therewith.

7. Apparatus according to claim 2, wherein said displacement means comprises gear means interconnecting said drum member and said member to be controlled.

8. Apparatus according to claim 3, in which said displacement means includes means mounting said drum on said member to be controlled for movement therewith and wherein said member to be controlled moves axially with respect to said drum.

9. Apparatus according to claim 3, in which said displacement means includes rack and pinion means operated by movement of said member to be controlled, further rack and pinion means for producing axial movement of said drum, and gear means interconnecting both of said rack and pinion means for producing axial movement of said drum at a reduced rate with respect to said member to be controlled.

References Cited in the file of this patent

UNITED STATES PATENTS

| | | |
|---|---|---|
| 2,582,073 | Scudder | Jan. 8, 1952 |
| 2,921,204 | Hastings | Jan. 12, 1960 |
| 2,945,959 | Atkinson | July 19, 1960 |